(12) United States Patent
Sathyanarayana et al.

(10) Patent No.: US 9,437,959 B2
(45) Date of Patent: Sep. 6, 2016

(54) SLIM LINE WHILE IN USE COVER AND METHODS FOR MAKING AND USING THE SAME

(71) Applicants: Ashok Alilughatta Sathyanarayana, Pune (IN); Lokesh Kumar Sahu, Pune (IN); Chandrakanthrao Gireeshrao, Carry, NC (US); Vishal Krishnarao Patil, Pune (IN)

(72) Inventors: Ashok Alilughatta Sathyanarayana, Pune (IN); Lokesh Kumar Sahu, Pune (IN); Chandrakanthrao Gireeshrao, Carry, NC (US); Vishal Krishnarao Patil, Pune (IN)

(73) Assignee: SIGMA ELECTRIC MANUFACTURING CORPORATION, Garner, NC (US)

(*) Notice: Subject to any disclaimer, the term of this patent is extended or adjusted under 35 U.S.C. 154(b) by 772 days.

(21) Appl. No.: 13/788,628

(22) Filed: Mar. 7, 2013

(65) Prior Publication Data

US 2013/0237088 A1 Sep. 12, 2013

Related U.S. Application Data

(60) Provisional application No. 61/608,296, filed on Mar. 8, 2012.

(51) Int. Cl.
*H01R 13/52* (2006.01)
*H01R 25/00* (2006.01)
*H02G 3/14* (2006.01)

(52) U.S. Cl.
CPC ........ *H01R 13/5213* (2013.01); *H01R 25/006* (2013.01); *H02G 3/14* (2013.01)

(58) Field of Classification Search
CPC ... H01R 13/5213; H01R 25/006; H02G 3/14
USPC ............ 174/66, 67; 439/522, 528, 529, 535
See application file for complete search history.

(56) References Cited

U.S. PATENT DOCUMENTS

| | | | |
|---|---|---|---|
| 1,648,582 A * | 11/1927 | Dodge, Jr. | H02G 3/18 174/504 |
| 4,607,136 A * | 8/1986 | Thomas | H01R 13/447 174/67 |
| 5,399,093 A * | 3/1995 | Schneider | H01R 39/64 439/21 |
| 7,381,894 B1 | 6/2008 | Shotey et al. | |
| 7,396,996 B1 | 7/2008 | Shotey et al. | |
| 7,541,540 B1 | 6/2009 | Shotey et al. | |
| 7,554,037 B1 | 6/2009 | Shotey et al. | |
| 7,598,452 B1 * | 10/2009 | Shotey | H01R 13/5213 174/66 |
| 7,619,163 B1 | 11/2009 | Shotey et al. | |
| 8,017,865 B1 | 9/2011 | Baldwin | |

* cited by examiner

*Primary Examiner* — Jenny L Wagner
*Assistant Examiner* — Michael E Motas, Jr.
(74) *Attorney, Agent, or Firm* — Cantor Colburn LLP

(57) ABSTRACT

In one embodiment, a while in use cover assembly 10, comprising: a lid 14 hingedly attached to a base 12 having a back wall 64; and socket assembly 52,152 comprising a receiver socket 20 attached to the lid 14 and/or the base 12, and located between the lid 14 and the base 12; wherein the receiver socket 20 comprises a face 122 with blade apertures configured to receive a power cord plug 86; wherein the socket face 122 changes orientation with respect to the back wall 64 when the lid is opened; and wherein the while in use cover assembly 10 is configured to be attached to an outlet socket 50.

30 Claims, 14 Drawing Sheets

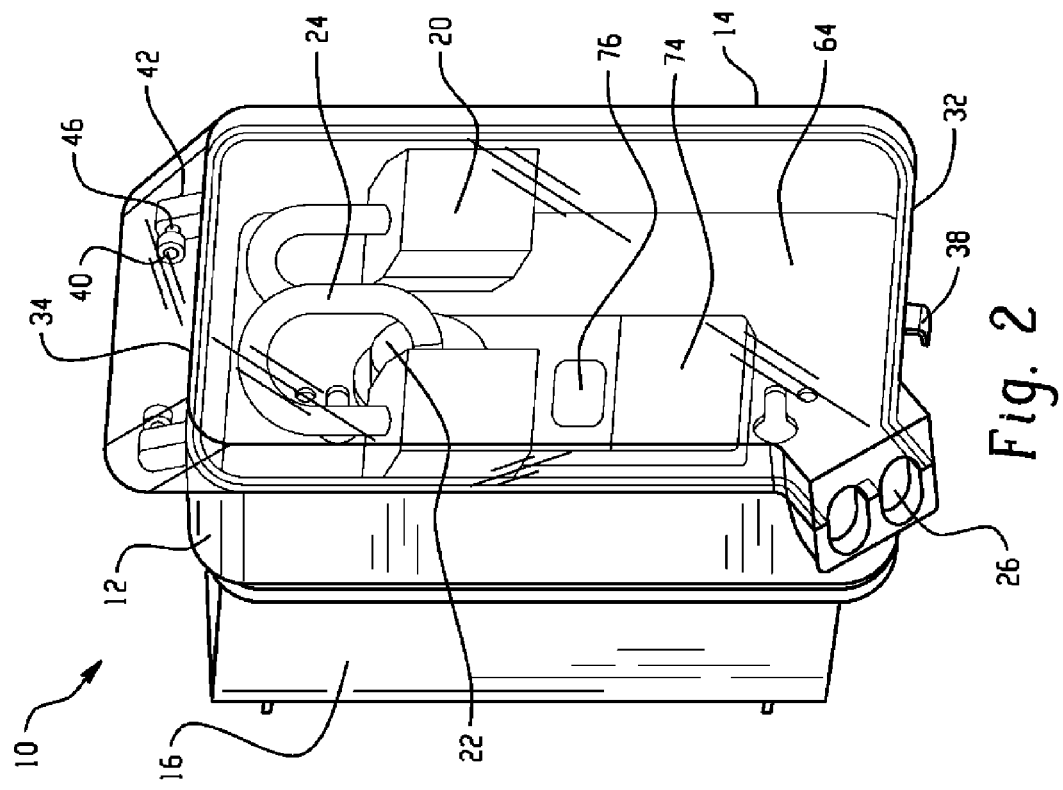
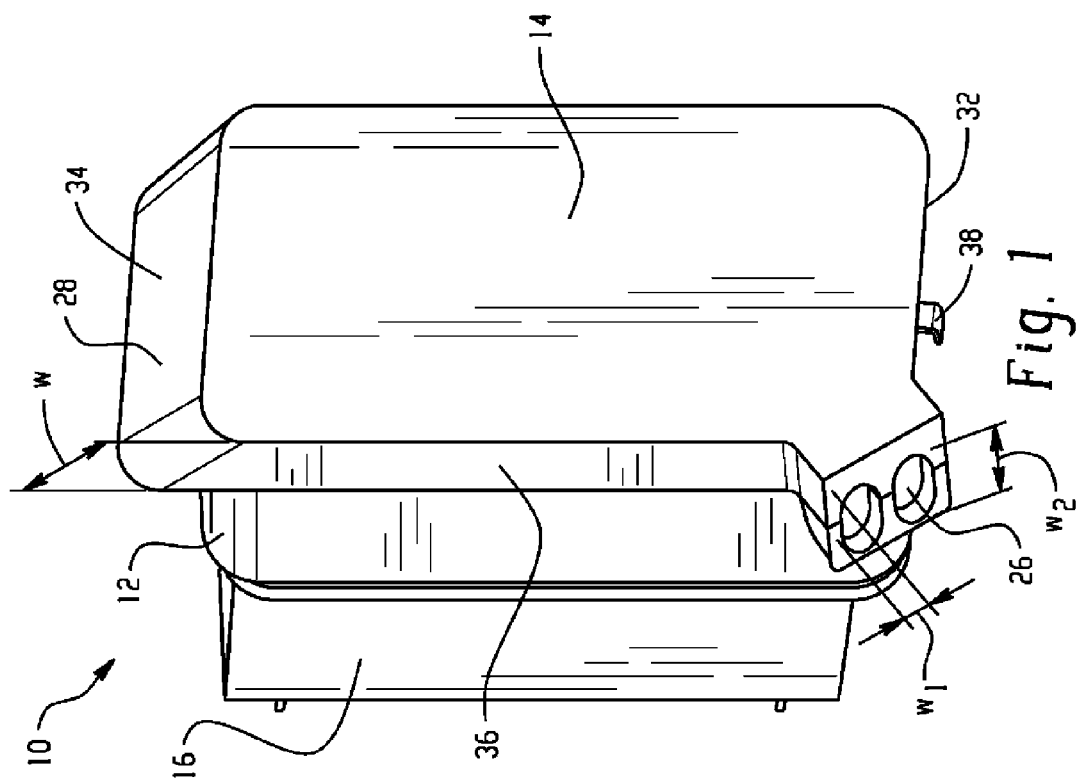
Fig. 1
Fig. 2

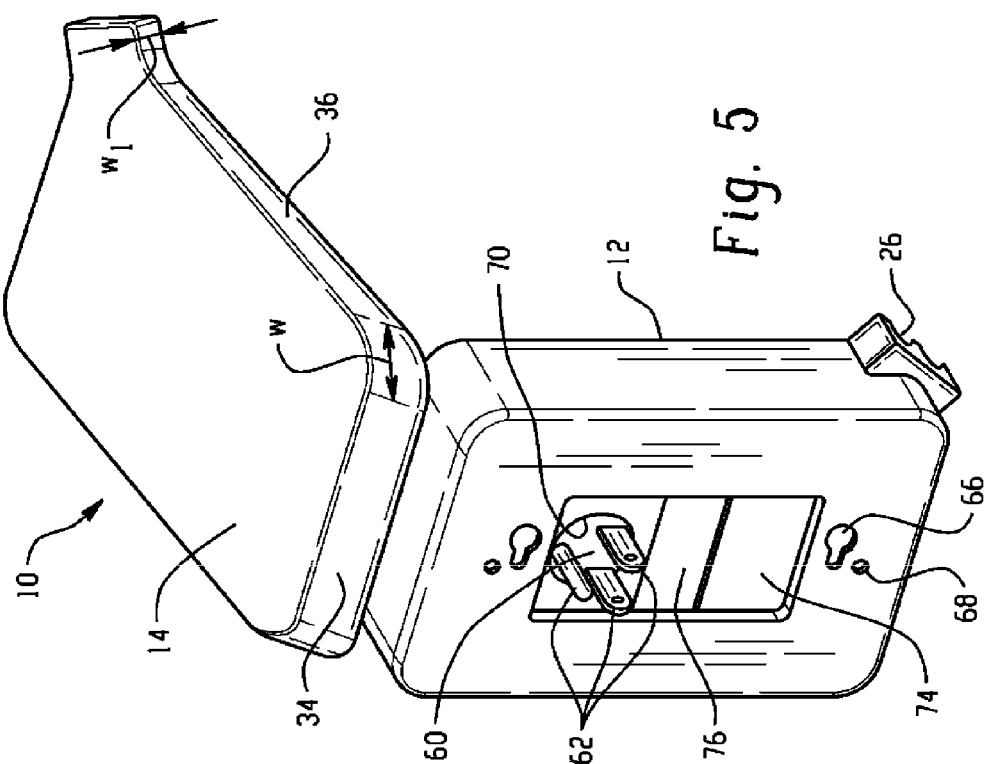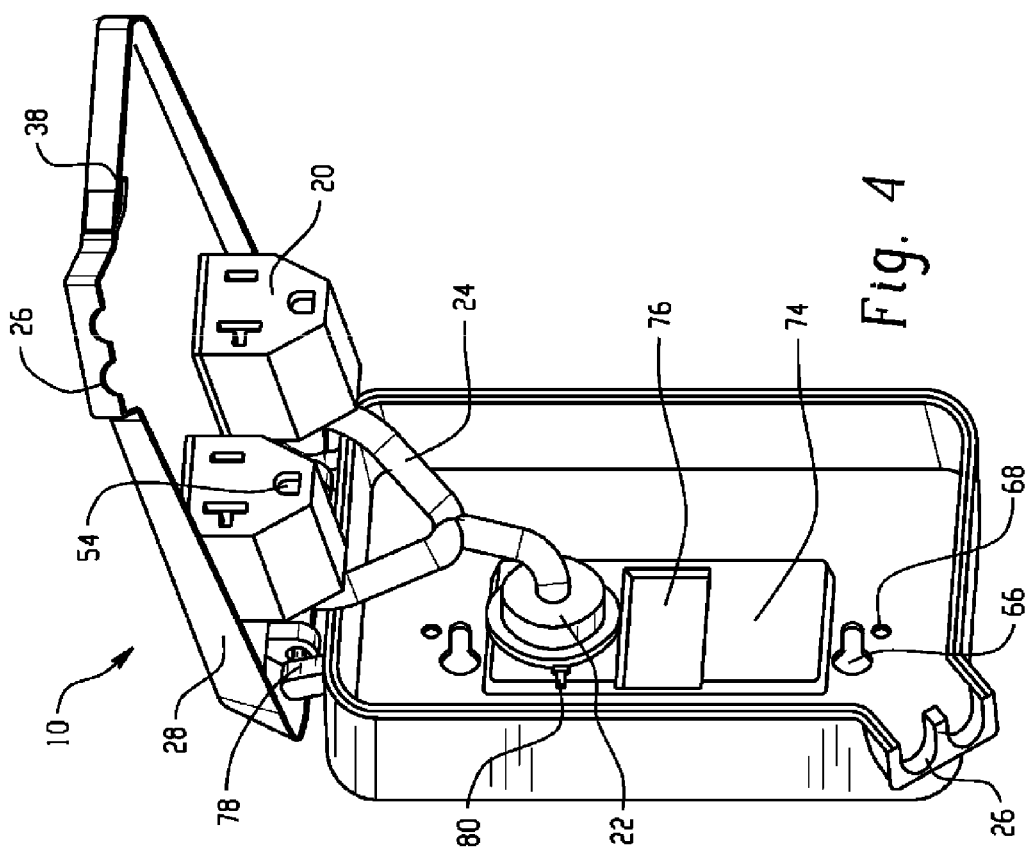

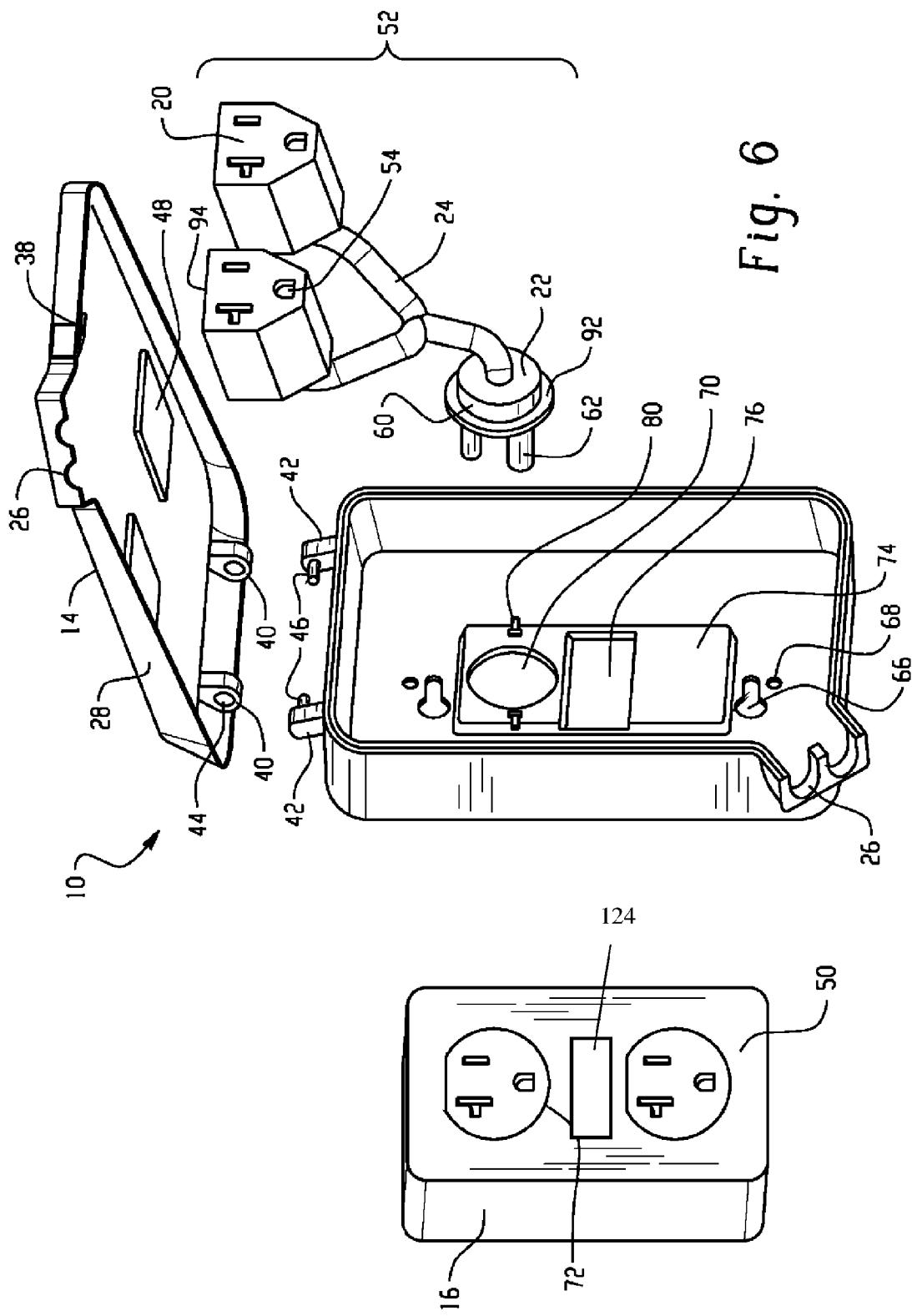

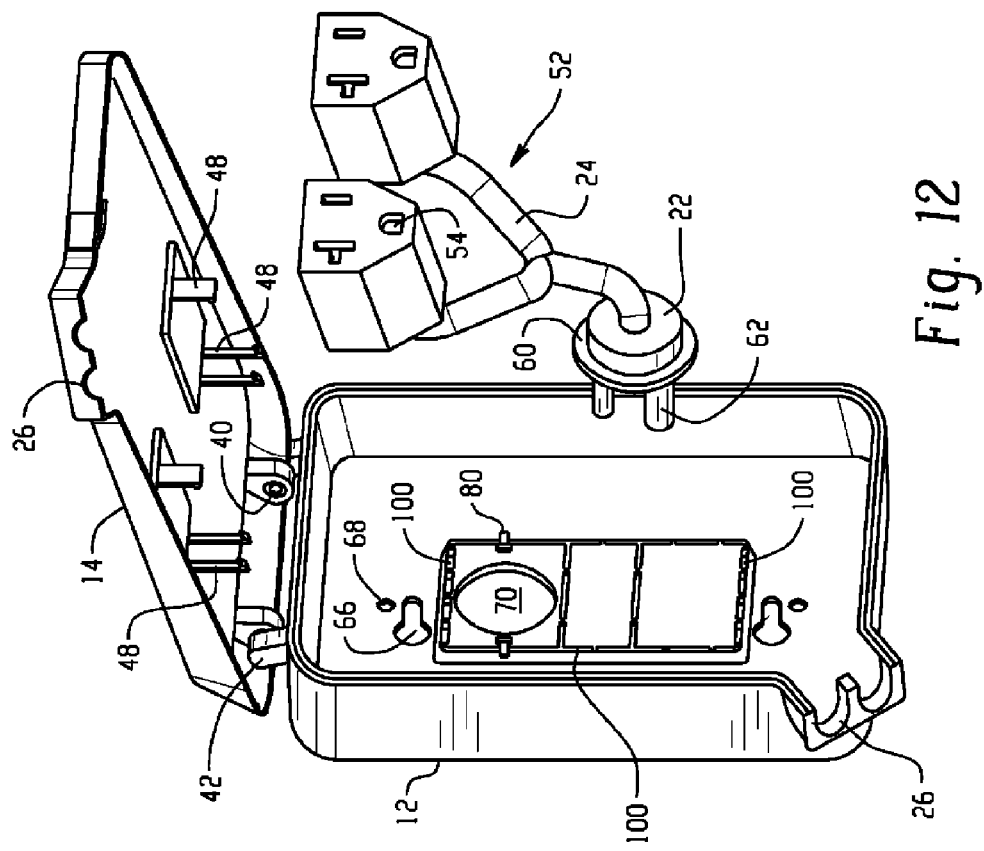
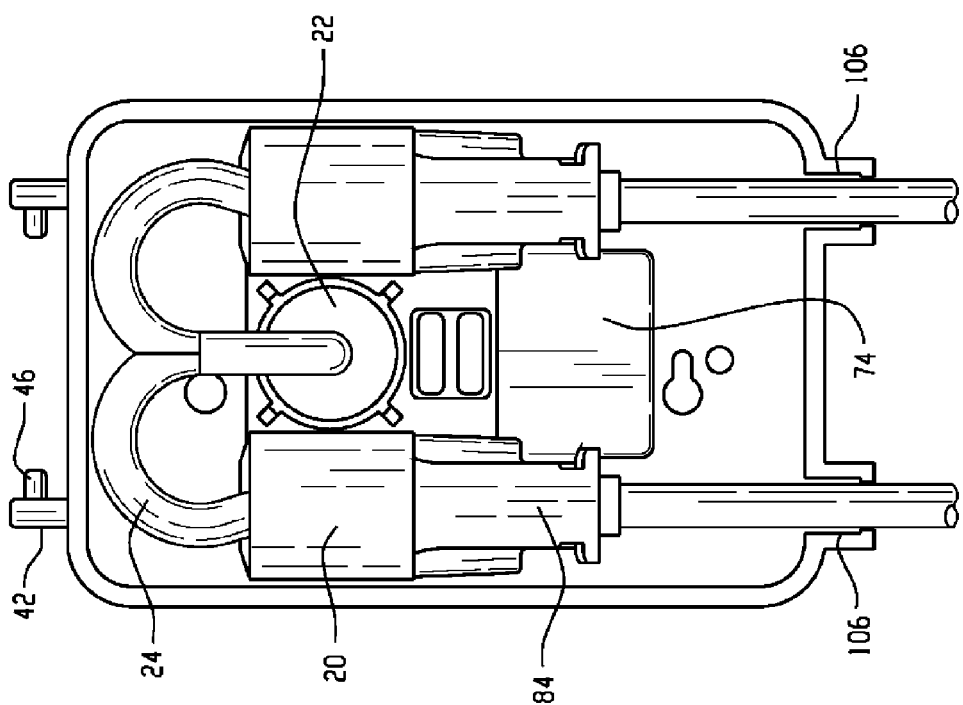
Fig. 12
Fig. 11

SLIM LINE WHILE IN USE COVER AND METHODS FOR MAKING AND USING THE SAME

CROSS REFERENCE TO RELATED APPLICATIONS

The present application claims priority to Provisional Patent Application Ser. No. 61/608,296, filed Mar. 8, 2012, which is hereby incorporated by reference in its entirety.

TECHNICAL FIELD

The instant application relates to while in use covers for protecting electrical outlets and plugs attached thereto from elements, such as water (e.g., rain, snow), dust, and/or other debris.

BACKGROUND

Electrical boxes are prone to exposure to water and other contaminants from the outside when mounted on exterior walls of various structures. While in use cover generally refers to a cover allowing an electrical plug to be plugged into an outlet while the cover is closed to protect the outlet and plug from the elements including weather (e.g., rain, snow), dust, and/or other debris. Typically, to allow a cover to close while the outlet is in use, the base and/or lid need to be deep enough to allow the cover to close without interfering with the plug when the plug is plugged into the outlet. Such devices are generally termed "bubble cover", which are deep enough to allow room for both the cord and the plug when the cover is closed. Such a design, however, poses aesthetic problems in that the covers protrude three or more inches from the exterior of a structure, which can be visually displeasing.

Expandable outlet covers, such as disclosed in U.S. Pat. No. 7,396,996, include at least two inter-fitting members that enable the cover to be retracted to the wall when not in use and expanded to increase the depth of the outlet cover and allow a plug to be plugged into the outlet when the cover is closed. However, this patent fails to address the overall dimensions of the cover when in use, such that the cover and outlet expand to 3 inches to 3.5 inches when in use. Flexible outlet covers have also been disclosed, such as disclosed in U.S. Pat. No. 7,381,894, which is an electrical device cover configured to mount over an electrical device including a lid having a flexible membrane. The lid is configured to expand through the flexible membrane to an expanded position to accommodate an electrical connector coupled with the electrical device. However, the lid can be difficult to open and the lid expands to at least 2.5 inches when in use, and thus, also fails to address the overall dimensions of the lid when in use.

There remains an unfulfilled need to provide a while in use cover that addresses the problem of bulky, unsightly while in use covers, while still providing protection from the elements.

BRIEF SUMMARY

Disclosed herein are while in use covers and methods for making and using the same.

In one embodiment, a while in use cover assembly 10, comprises: a lid 14 hingedly attached to a base 12 having a back wall 64; and socket assembly 152 comprising a receiver socket 20 physically attached to the lid 14 and/or the base 12, and located between the lid 14 and the base 12. The receiver socket 20 comprises a socket face 122 with blade apertures configured to receive a power cord plug 86. The socket face 122 changes orientation with respect to the back wall 64 when the lid is opened. The while in use cover assembly 10 is configured to be attached to an outlet socket 50.

In another embodiment, a while in use cover assembly 10, comprises: a lid 14 connected to a base 12 having a power cord exit 106 and a back wall 64; and socket assembly 52,152 comprising a receiver socket 20 located between the lid 14 and the base 12. The receiver socket 20 comprises a socket face 122 with blade apertures configured to receive a power cord plug 86. The while in use cover assembly 10 has a constant depth, when the lid 14 is closed, when in use and when not in use. When the while in use cover assembly 10 is in use, a power cord plug 86 is attached to the receiver socket 20, and a power cord 98 extending from the power cord plug 86 extends through the power cord exit 106 while bending toward the back wall 64 or the lid by less than or equal to 15 degrees as measured from an angle parallel with an axis A.

In an embodiment, a method of using a while in use cover assembly 10, comprises: opening a lid of the while in use cover assembly 10, wherein the while in use cover assembly 10 comprises a lid 14 hingedly attached to a base 12 having a back wall 64 with a junction box attachment portion 66,68; and socket assembly 52,152 comprising a receiver socket 20 physically attached to the lid 14 and/or the base 12, and located between the lid 14 and the base 12; wherein the receiver socket 20 comprises a face 122 with blade apertures 82 configured to receive a power cord plug 86; wherein as the lid is opened, the socket face 122 changes orientation with respect to the back wall 64; and attaching the while in use cover assembly 10 to a junction box via the junction box attachment portion 66,68.

In another embodiment, a method of using a while in use cover assembly 10, comprising: opening a lid of the while in use cover assembly 10, wherein the while in use cover assembly 10 comprises: a lid 14 hingedly attached to a base 12 having a back wall 64 with a junction box attachment portion 66,68; and socket assembly 52,152 comprising a receiver socket 20 physically attached to the lid 14 and/or the base 12, and located between the lid 14 and the base 12; wherein the receiver socket 20 comprises a face 122 with blade apertures 82 configured to receive a power cord plug 86; changing an orientation of the socket face 122; inserting the male socket 84 into the blade apertures 82; and attaching the while in use cover assembly 10 to a junction box via the junction box attachment portion 66,68.

These and other features of the while in use cover and method of making will be understood from the drawings and description below.

BRIEF DESCRIPTION OF THE DRAWINGS

Refer now to the figures, which are merely exemplary, not limiting, and wherein like elements are numbered alike, and are not necessarily re-described in relation to each figure.

FIG. 1 is an isometric, assembled view of a while in use cover attached to an electrical box.

FIG. 2 is an isometric, assembled view of a transparent while in use cover attached to an electrical box.

FIG. 4 is an isometric, perspective view of a while in use cover assembly having a base with an adapter plug attached thereto and a cover with receiver plugs attached thereto.

FIG. 5 is an isometric, perspective back view of the while in use cover assembly of FIG. 4.

FIG. 6 is an exploded, disassembled perspective view of a while in use cover assembly having a cover, a base, receiver plugs, and an adapter plug.

FIG. 11 is an isometric, assembled view of a while in use cover assembly with a power cord exit in line with the power cord plug.

FIG. 12 is an exploded, disassembled perspective view of a while in use cover assembly having a cover, a base, receiver plugs, and an adapter plug.

DETAILED DESCRIPTION

Figure 3:
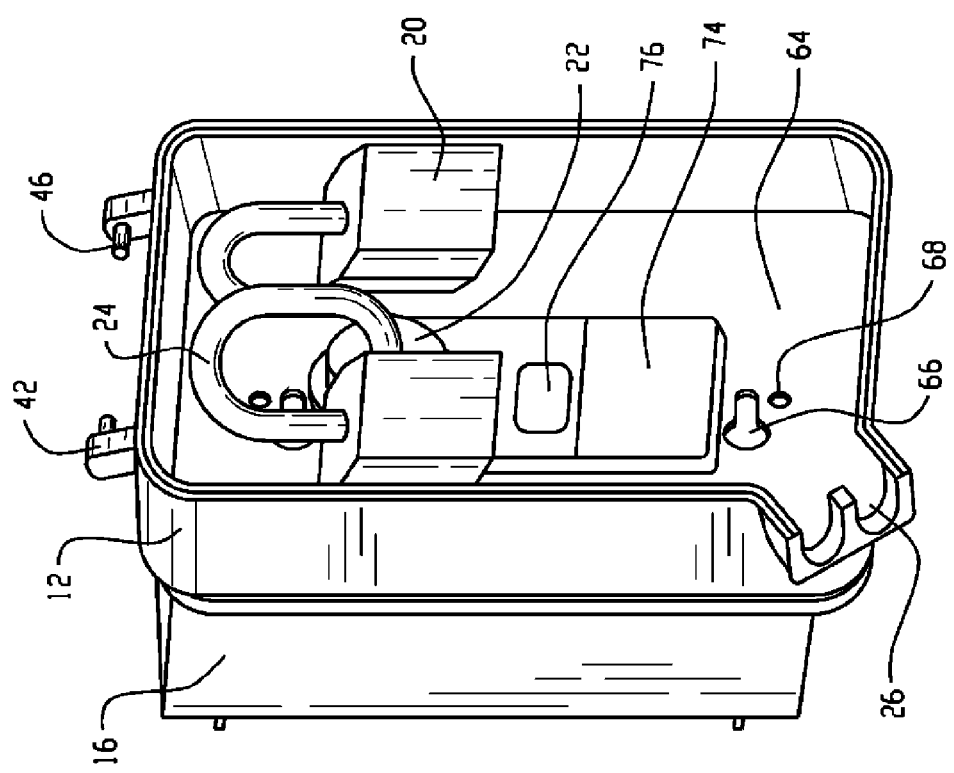
FIG. 3 is an isometric, perspective view of an electrical box with receiver plugs attached to a base.

Disclosed herein are while in use cover assemblies that can be attached to an electrical box that is itself attached to a structure (e.g., to an exterior structure). The while in use cover assemblies can comprise a base and a lid with a cord assembly comprising a receiver plug that can be attached to the lid. The while in use cover assemblies can have a constant depth, i.e., the same depth when the lid is closed, when in use and when not in use. The constant depth of the while in use cover assemblies can allow for an overall lower profile than was previously attainable, e.g., using a bubble lid or an expandable cover. As used herein, "constant depth" means that the depth does not change if the assembly is in use (with a power cord extending out from the assembly) or not in use, the depth stays the same. The while in use cover assemblies disclosed herein solve the problem of bulky, unsightly while in use covers, while still providing protection from the elements.

The cord assembly can further comprise an adapter plug connected to a receiver plug via a cord, where the receiver plug can be optionally attached to the lid, and/or optionally attached to the base, and/or a separate component from the base and the lid. As mentioned, the configurations disclosed herein for the while in use cover assembly can allow for a lower profile while in use cover assembly than was previously attainable, e.g., with a bubble lid or with an expandable cover. For example, bubble lids generally have a depth of greater than or equal to 3.5 inches (9 centimeters (cm)). The while in use cover assemblies disclosed herein, however, can be flat, e.g., the while in use cover assemblies can have a constant overall depth that is less than or equal to 1.5 inches (3.8 cm), specifically, less than or equal to 1.25 inches (3.2 cm), even when in use (e.g., when a power cable plug is attached to the receiver plug). The adapter plug can be inserted into an outlet socket so that when the lid is in an open position, the receiver plug is at a non-parallel angle to the base (e.g., perpendicular to the base) and a power cable plug can be inserted into the receiver plug with ease. Once the power cable plug has been inserted, the lid can be closed (e.g., the lid can be a self-closing lid, i.e., the weight of the lid can pull the lid down and essentially force the while in use cover assembly into a closed position). The various components of the base (e.g., walls and cord opening) are generally substantially parallel to the structure to which it is attached. For example, the components of the base can be angled forward slightly to facilitate insertion of the plug. In other words, if something is substantially parallel to the base, it is also substantially parallel to the structure to which the base is attached.

In all embodiments, when the lid is closed, the receiver plug and cord are parallel to the base. In embodiments where the receiver plug is attached to the base, the orientation of the receiver plug does not change when the lid is either in the open position or in the closed position. In an alternate embodiment, the receiver plug and adapter plug form a cord assembly that can be a separate component from the base and the lid (e.g., the cord assembly can be removably attached to the while in use cover assembly). Such a configuration has the advantage of allowing replacement of just the cord assembly if needed instead of replacing the entire while in use cover assembly.

The lid can, optionally, comprise an angled or tapered edge (e.g., a lip) to facilitate the removal of water or other debris coming into contact with and/or entering the while in use cover assembly and possibly damaging the components located therein. The lid and the base can be attached to one another via an attachment mechanism, which can be, for example, a hinge or a snap fit connection. If a hinge is used, the hinge can comprise a pin and an opening configured to receive the pin. The pin can be located on the lid or the base and the opening can be located on the base or the lid. The attachment mechanism can comprise a single hinge or multiple hinges, and if multiple hinges are used, they can optionally be detachable. The hinge can be located on any surface of the lid and/or the base that will allow the lid and base to connect together. For example, the hinge can be located on a corner of the base or lid, in a center of a top portion of the base or lip (e.g., along a shorter side), on a side portion of the base or lid (e.g., along a longer side), and combinations comprising at least one of the foregoing. In some embodiments, with the hinge in any of the locations described, the base can, optionally, comprise a channel in which the lid can be inserted (e.g., the edge of the base can comprise a channel where the outside perimeter of the lid sits in the channel when the while in use cover assembly is closed). Here, a gasket can, optionally, be used to create a seal between the lid and the base so that the entry of contaminants into the while in use cover assembly can be prevented. The lid and/or base of the while in use cover assembly can contain an exit for the power cord plug along any point on the bottom edge of the lid and base (e.g., on the left hand side, and/or the right hand side, and/or the middle).

The adapter plug can be connected to a sufficiently flexible cord to allow the plug elements of the adapter plug to be oriented to be received in the outlet and/or the adapter plug can comprise a rotatable plug head that can rotate to the desired orientation when placing the plug elements of the adapter plug into the outlet (e.g., the plug elements can be moved without changing the cord orientation). The flexible cord and/or rotatable head allows the while in use cover assembly to be oriented vertically (e.g., wherein the longest side of the base is perpendicular to the ground/floor) or horizontally (e.g., wherein the longest side of the base is parallel to the ground/floor) with respect to the ground or floor by rotating the while in use cover assembly to the desired orientation and then orienting the plug elements to engage the socket of the junction box. Optionally, the lid can be attached to one of the longest sides of the base if the while in use cover assembly will be oriented horizontally, and attached to one of the shorter sides of the base if the while in use cover assembly will be oriented vertically. Optionally, hinges can be located on a shorter and other hinges on a longer side of the base and lid so that either orientation of the while in use cover assembly can be used.

Referring now to the figures, which are exemplary and not intended to limit the scope hereof. A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIGS. 1 through 7 illustrate various views of an embodiment of the while in use cover assembly 10. FIGS. 1 and 2 illustrate an assembled view of the while in use cover assembly 10. FIG. 1 illustrates that the while in use cover assembly 10 can comprise a base 12 and lid 14 attached to a junction box 16. A power cord exit 26 can be located on the lid 14 on any location along a lid second side 32 of the lid 14 with corresponding indentations on a base second side 90. As is illustrated, the power cord exit(s) 26 can be located at a corner of the base and lid to facilitate use of the assembly in the vertical or horizontal orientations (see e.g., FIGS. 1-7, 10, and 12). In other words, the power cord exit 26 can comprise a power cord exit 104 that is diagonal to the receiver socket 20. Optionally, power cord exit(s) 26 can be located through a wall of the lid (14), instead of a corner. In such an embodiment, the cord can extend straight from the receiver socket 20, out of the cord assembly 52 as illustrated in FIGS. 11 and 13-16. In other words, the power cord exit 26 can comprise a power cord exit 106 that is in line with the receiver plug(s) 20. The power cord exit can have a width, $w_2$, (see FIG. 1) that is configured to receive a power cord plug 86. In other words, the power cord exit (26) can hold the power cord plug (86) in place.

The lid 14 can also, optionally comprise a lid lip 28 around the perimeter of the lid 14 that facilitates drainage of water or other foreign contaminants from seeping into the base 12. The lid lip 28 can be wider along a lid lip first portion 34 and can gradually become smaller toward a lid lip second portion 36 (e.g., the lid lip 28 can comprise a lid lip first portion 34 having a width, w, that is larger than a lid lip second portion 36, having a width that decreases from w to $w_1$). Stated another way, the lid lip 28 can be angled or tapered to allow water or other contaminants that can come into contact with the while in use cover assembly 10 to run down and off the lid 14 rather than entering the while in use cover assembly 10 and potentially short circuiting or otherwise damaging the junction box 16. The lid 14 can further comprise a lid tab 38 located on the lid second side 32. The lid tab 38 can be used for opening and closing of the lid 14. Although the lid tab 38 is illustrated on the lid second side 34, it is to be understood that the lid tab 38 can be on any location of the lid 14. The lid tab 38 can engage a slot 96 through the base 12, thereby enabling, for example, a snap closure that can facilitate retention of the lid in the closed position.

Figure 7:
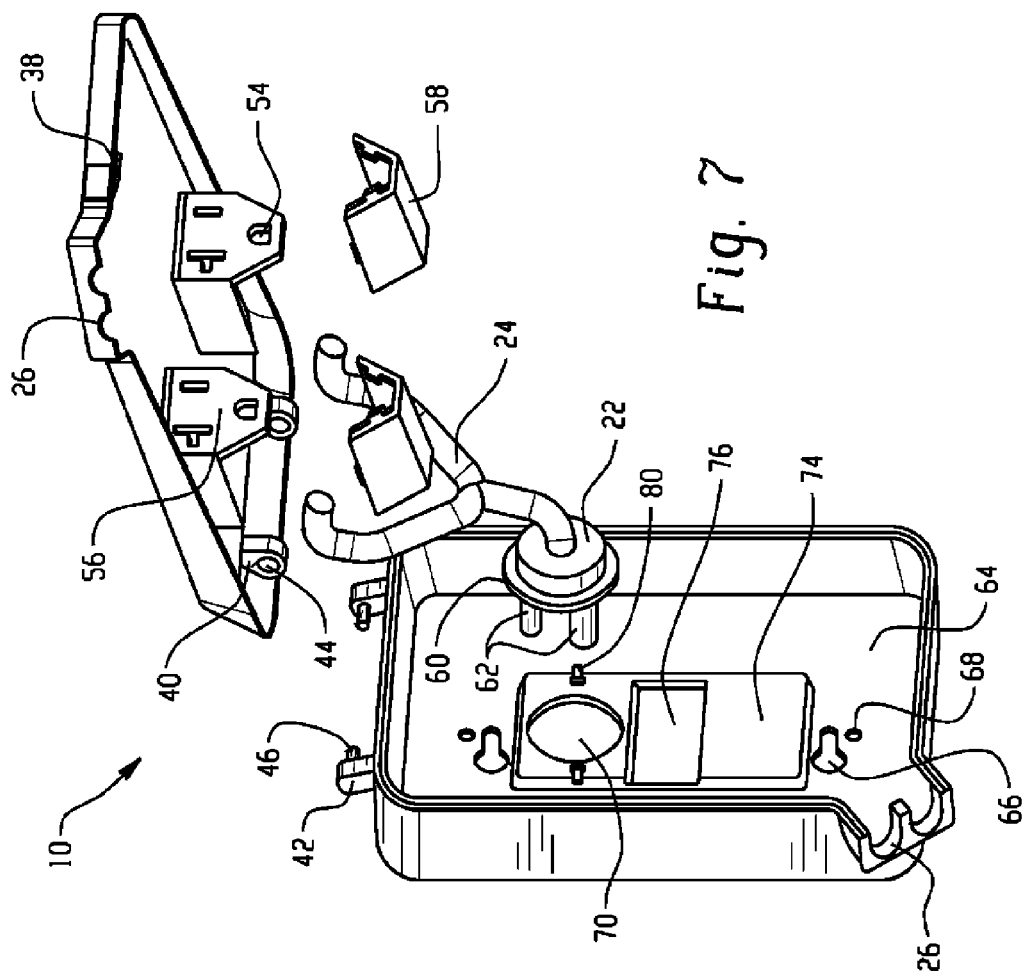
FIG. 7 is an exploded, disassembled perspective prospective view of another embodiment of a while in use cover assembly.
Figure 9:
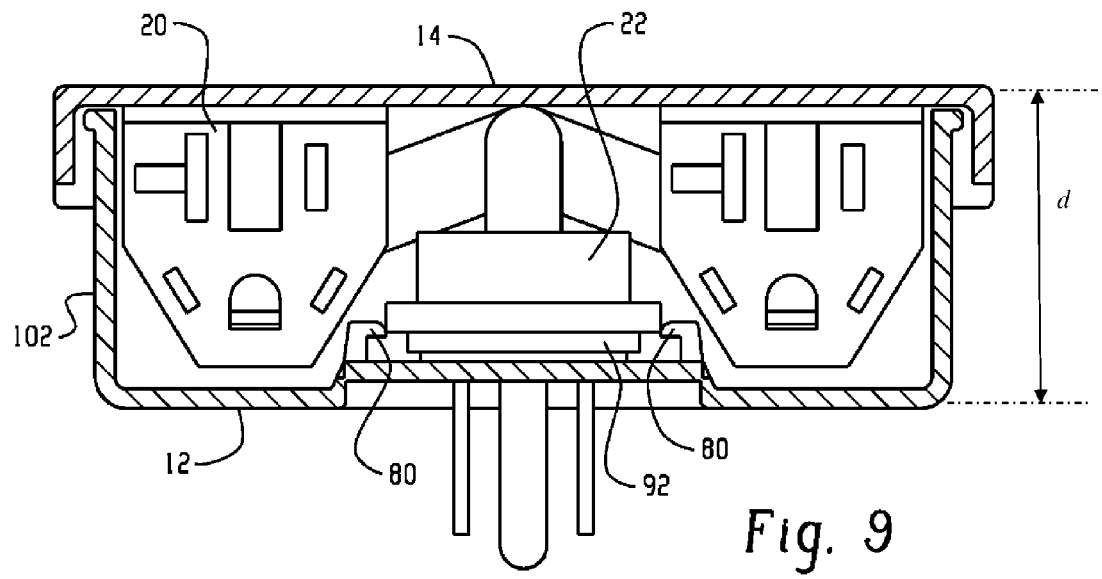
FIG. 9 is a bottom view of a while in use cover assembly with a base comprising a channel.
Figure 10:
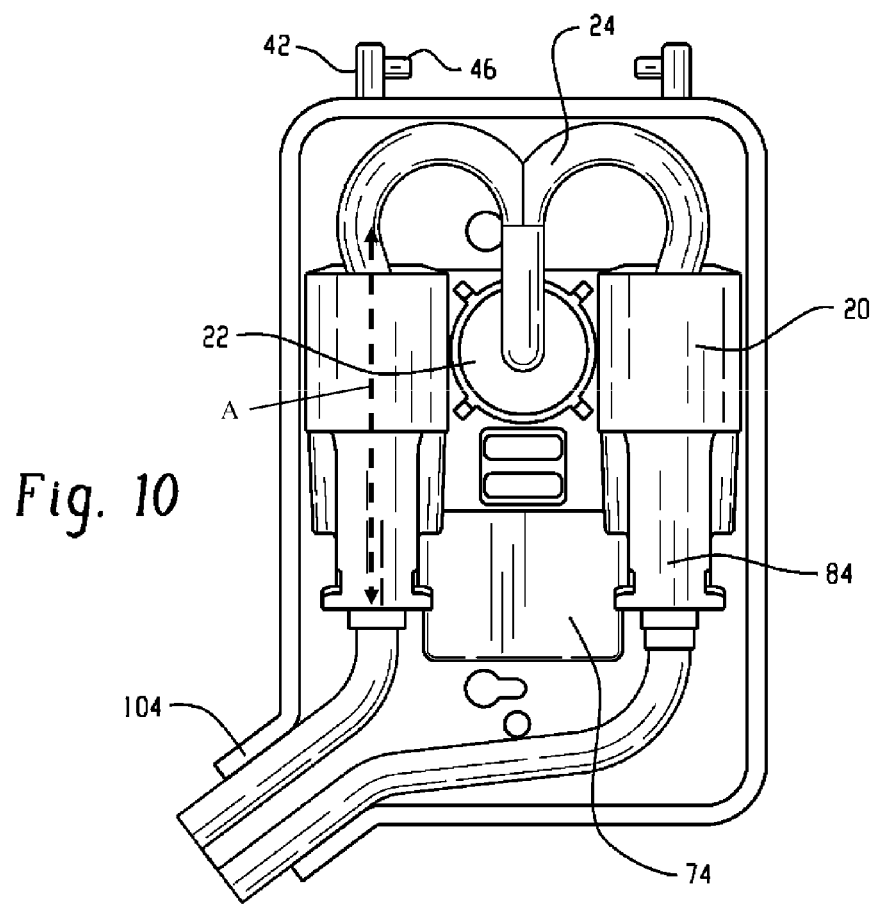
FIG. 10 is an isometric, assembled view of a while in use cover assembly with a corner power cord exit.

As can be seen in FIGS. 4, 6, and 7, the lid 14 can additionally comprise a lid attachment portion 40 comprising an opening 44 that can be configured to engage with a pin 46 of a base attachment portion 42. It is to be understood, however, that the attachment portions are not limited and the base attachment portion can contain the opening 44 and the lid attachment portion 40 can contain a pin 46. The pin 46 and opening 44 can form a hinge 78 as illustrated in FIG. 4. The hinge 78 can be located on any side of the base 12 and/or the lid 14 that will allow the base 12 and lid 14 to connect together. For example, the hinge 78 can comprise a pin 46 and an opening 44 attached on a corner of the base and lid (e.g., a corner hinge) or can be located at any point along any of the walls of the base 12 or lid 14. Optionally, the assembly can have more than 4 sides, e.g., to accommodate a corner hinge. It is to be understood, however, that other hinge configurations are possible (e.g., multiple pins and openings). It is contemplated that the pin 46 and opening 44 can be attached on a first wall, a second wall, and/or a side wall of the base 12 and/or the lid 14 to create the hinge 78. Therefore, although a vertical design is illustrated, a horizontal design is also contemplated.

The lid 14 can be opaque (e.g., cannot be seen through by a user), and/or can be transparent (e.g., can be seen through by a user), and/or can be partially opaque and/or partially transparent. For example, a top half of the lid 14 can be opaque so that a user cannot see the receiver socket 20 when the lid 14 is closed and a bottom half of the lid 14 can be transparent, or the lid can have a transparent portion (e.g., a window). The window, for example, could enable a user to see the status of the outlet (e.g., whether functioning properly or if the outlet has been tripped and needs to be reset). For example, some outlets (e.g., ground fault circuit interrupters (GFCI)) have an indicator light that is green when the outlet is functioning properly and that is red when the outlet is not functioning properly and requires attention. Being able to see the status of the outlet through a transparent portion would be advantageous in that the lid 14 would not need to be opened in order to determine that there is a problem. As used herein, "transparent" refers to sufficient optical clarity such that a user can see the desired portion of the outlet through the lid.

The lid 14 can further, optionally, comprise a cord assembly 52 comprising an adapter plug 22, an adapter plug cord 24, and receiver plug(s) 20. Optionally, the receiver plug(s) 20 can be removably coupled to the lid 14 such that if the cord assembly 52 fails, the cord assembly 52 can be removed and replaced with a new cord assembly 52 without having to replace the entire while in use cover assembly 10.

In other words, removal of the cord assembly 52 would not damage the base 12 or lid 14. For example, the cord assembly 52 can be attached to the lid 14 via a snap fit connection between the receiver plug(s) 20 and an attachment mechanism 48 attached to an inside surface of the lid 14 (see e.g., FIG. 12). Other techniques of coupling the lid 14 and receiver socket 20 are contemplated, such as an adhesive or bonding element dispersed between the attachment mechanism 48, which can, optionally, have a shape to match with a top of the receiver plug(s) 20 (e.g., a square shape); as well as a pressure fit or any other techniques of attaching the lid 14 and receiver plug(s) 20. In another embodiment, the receiver plug(s) 20 can be integral with the lid (14) (i.e., not removable). In such an embodiment, the receiver plug(s) 20 are molded, bonded, or otherwise irremovably secured to the lid. Integral and irremovably are intended to mean that removal of the receiver plug(s) 20 from the lid 14 would damage the lid 14 and/or the plugs 20.

Figure 13:
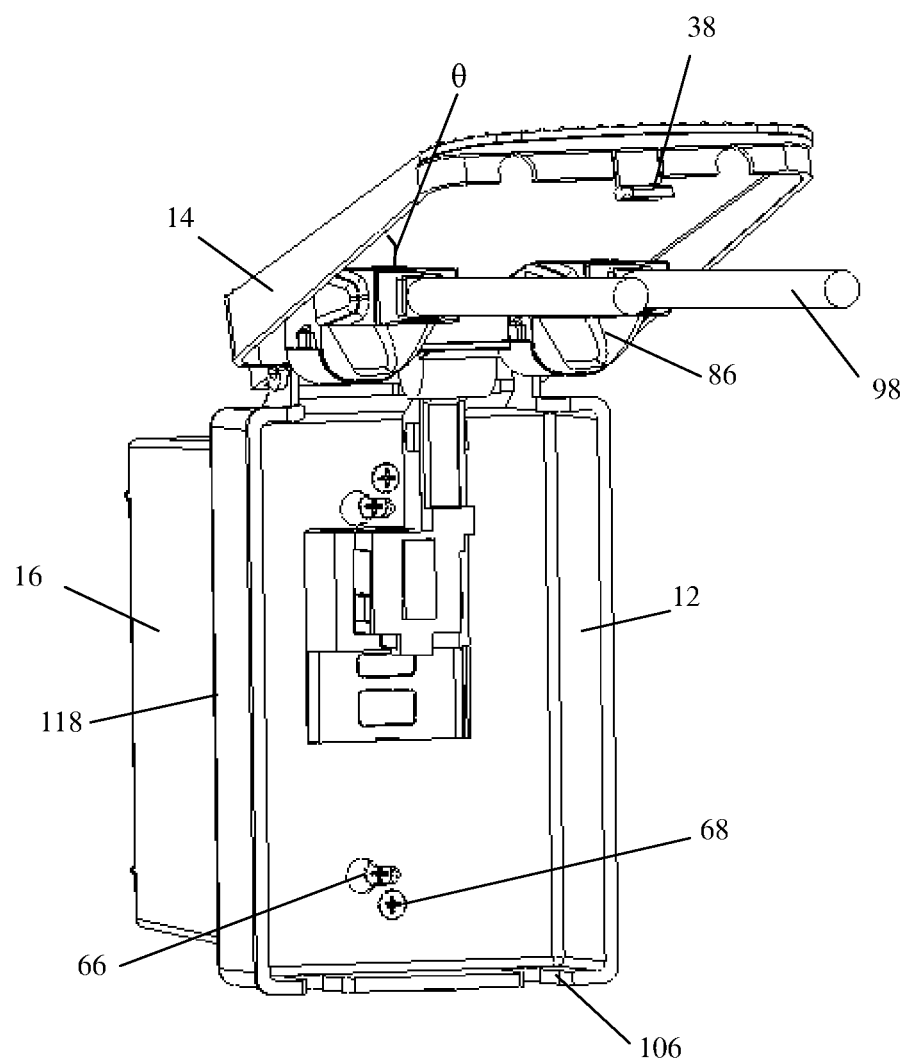
FIG. 13 is a front perspective view of another embodiment of a while in use cover assembly having receiver plugs on the lid and attached to a junction box.
Figure 14:
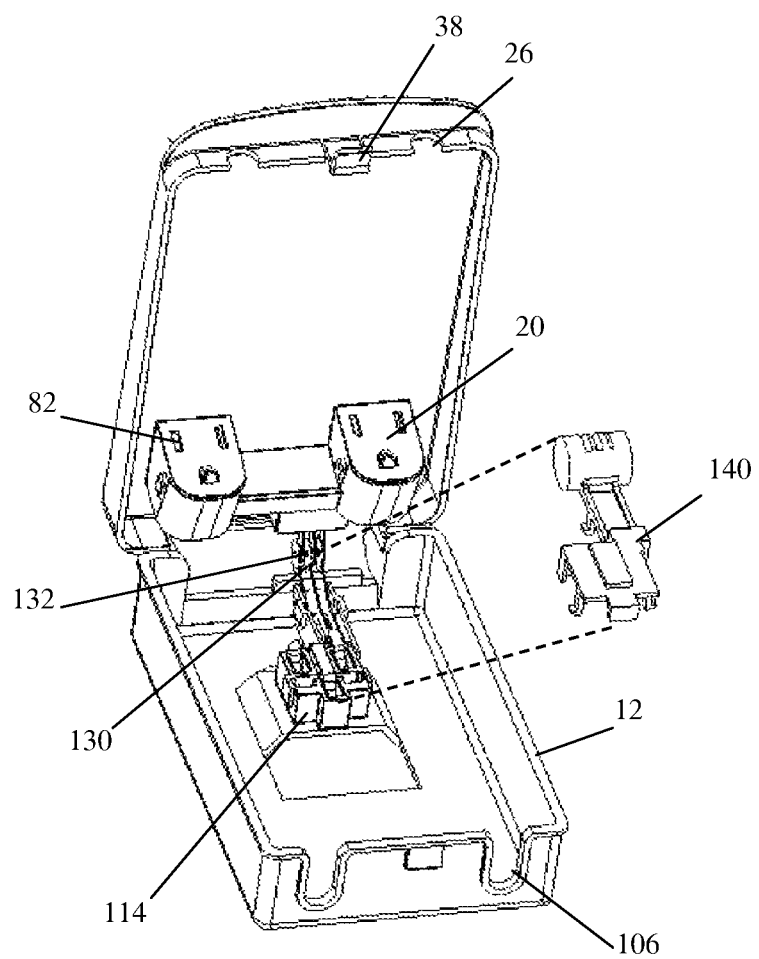
FIG. 14 is partially disassembled perspective view of the while in use cover assembly of FIG. 13.
Figure 15:
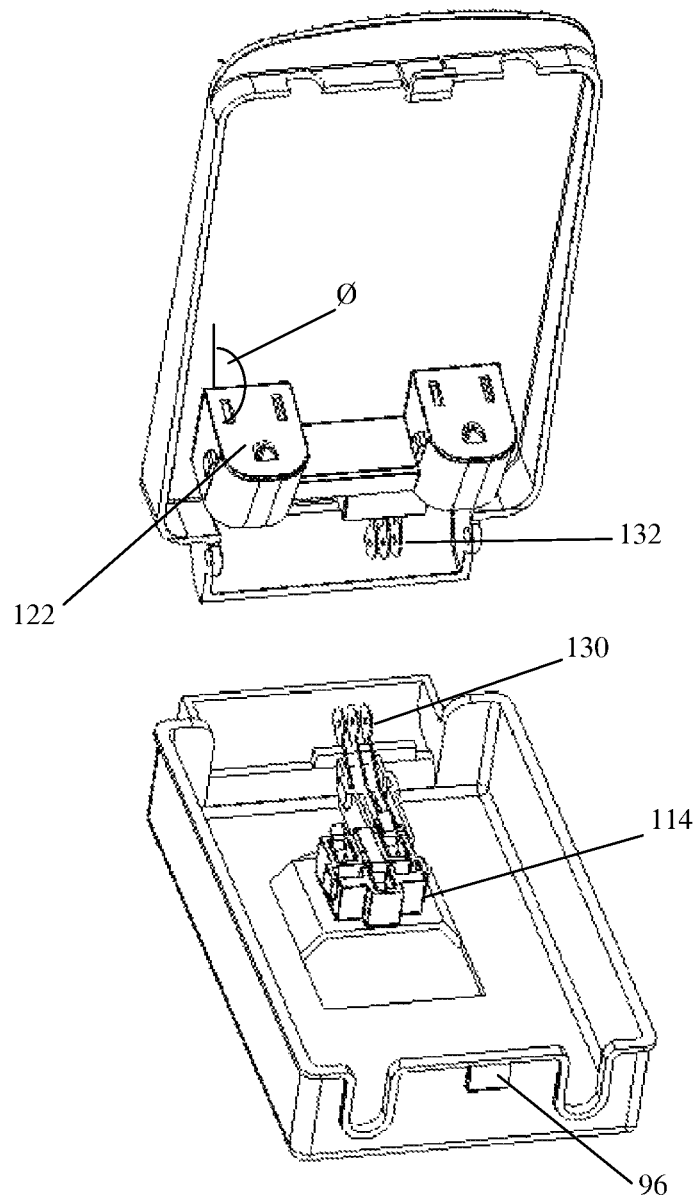
FIG. 15 is an exploded perspective view of another embodiment of a while in use cover assembly and junction box, with pivotable receiver plugs.

As is illustrated in FIGS. 13 and 14, the lid can comprise receiver plug(s) 20 that are directly connected to lid terminals, wherein the lid terminals 132 are in physical (and hence electrical) contact with base terminals 130, e.g., without the use of a cord assembly. As is illustrated, the blade apertures 82 of the receiver plug(s) 20 are electrically connected to the terminals 132 so that electricity can be directed through the terminals 132, through the receiver plugs 20 and to the power cord 86 during use. Here, the lid terminals 132 contact the base terminals 130 in the connector 114. Here, the receiver plugs are attached to lid terminals which are in direct physical contact with base terminals, e.g., instead of a cable from the receiver plugs to the adaptor. For integrity of the electrical connection between the receiver plug(s) 20 and the base terminals 130, the receiver plugs should be formed integral with the lid, e.g., are not removably attached to the lid, but are permanently attached.

The base terminals 130 can be electrically connected to a socket 72 of a junction box 16 via the adaptor 110 and the connector 114. (see FIGS. 14-19) The connector 114 houses terminals 130 and can receive the adaptor elements 112 of the adaptor 110. The adaptor 110 can have plug elements 62 for insertion into the socket 72, with the adaptor elements 112 for insertion into connector 114. The adaptor 110 can be permanently attached to the connector 114 (e.g., welded or otherwise irremovably attached), or can be removable, enabling assembly on location; e.g., the adaptor 110 can be attached to either the socket 72 or the connector 114 and subsequent assembly to the other. Optionally, the terminals 130 can be protected with a cover 140. (see FIGS. 14 and 17)

When the receiver plugs 20 are attached to the lid 14, the receiver socket face 122 can be angled away from the lid. In other words, the socket face 122 of the receiver socket 20 can be oriented with respect to the lid such that it does not form a 90 degree angle with the lid; in other words, it is not perpendicular to the lid 14. The angle Ø that the socket face 122 forms with the lid 14 can be greater than 90 degrees, for example, 95 degrees to 135 degrees, or 100 degrees to 120 degrees, or 105 degrees to 115 degrees. With the socket face 122 at greater than 90 degrees to the lid 14, the installation of a power cord plug 86 into the receiver socket 20 is simplified. Also, due to the angle of the socket face 122, when the plug 86 has been inserted into the receiver socket 20, it will form an angle θ with the lid 14. (see FIG. 13) The angle θ can be greater than 0 degrees, for example, 5 to 45 degrees, specifically 10 to 20 degrees.

It is further noted that the design of the assembly is such that it is not necessary to bend the power cord to about 90 degrees of the power cord plug in order to close and secure the lid. Bubble covers were designed with sufficient room to enable the power cord plug to extend from a socket at an angle of about 90 degrees to the power cord exit from the lid. In the present while in use cover assembly 10, the power cord plug 86 can extend from a receiver socket 20 at an angle (with respect to the lid 14 and the back wall 64) that is substantially parallel with the power cord exit 106. In other words, the power cord 98 can exit the while in use cover assembly 10 at a cord angle that is between θ−15 degrees and θ+15 degrees. Hence, when the while in use cover assembly 10 is in use, a power cord plug 86 can be attached to the receiver socket 20, and a power cord 98 extending from the power cord plug 86 can extend through the power cord exit 106 while bending toward the back wall 64 or the lid by less than or equal to 15 degrees, e.g., as measured from the angle parallel with an axis A. (See FIGS. 10 and 13)

Figure 16:
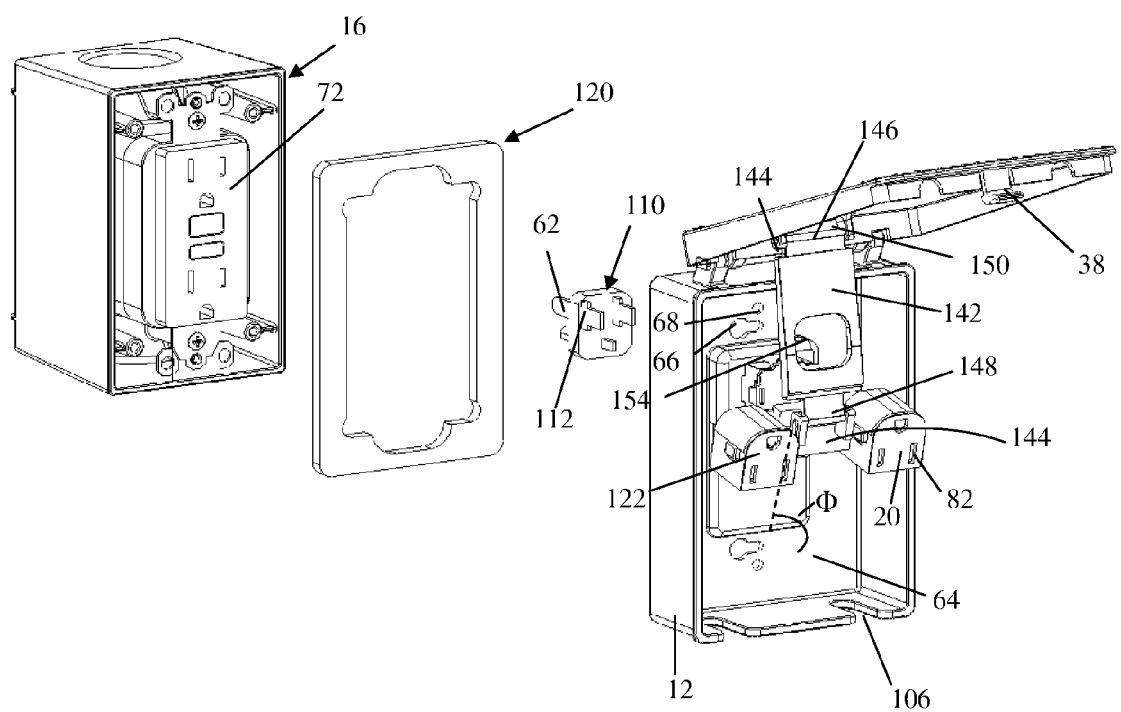
FIG. 16 is a partially assembled perspective view of the base of the while in use cover assembly of FIG. 15.
Figure 17:
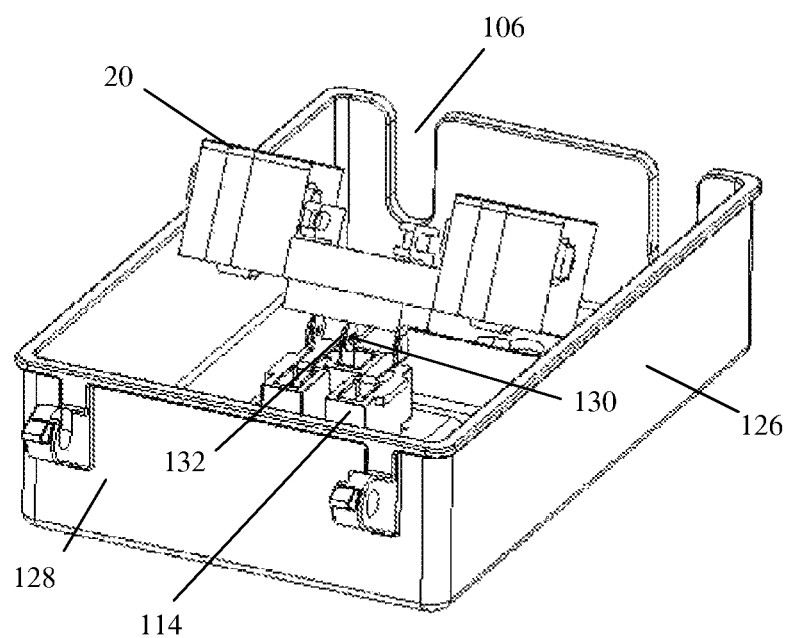
FIG. 17 is a perspective view of a base of a while in use cover assembly with a receiver plug assembly attached to the base.
Figure 18:
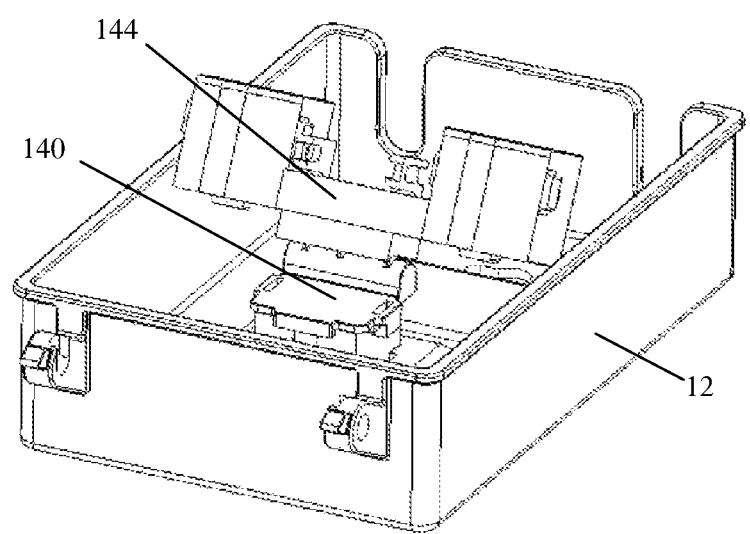
FIG. 18 is a perspective view of the base of FIG. 17 with a cover located over the terminals.
Figure 19:
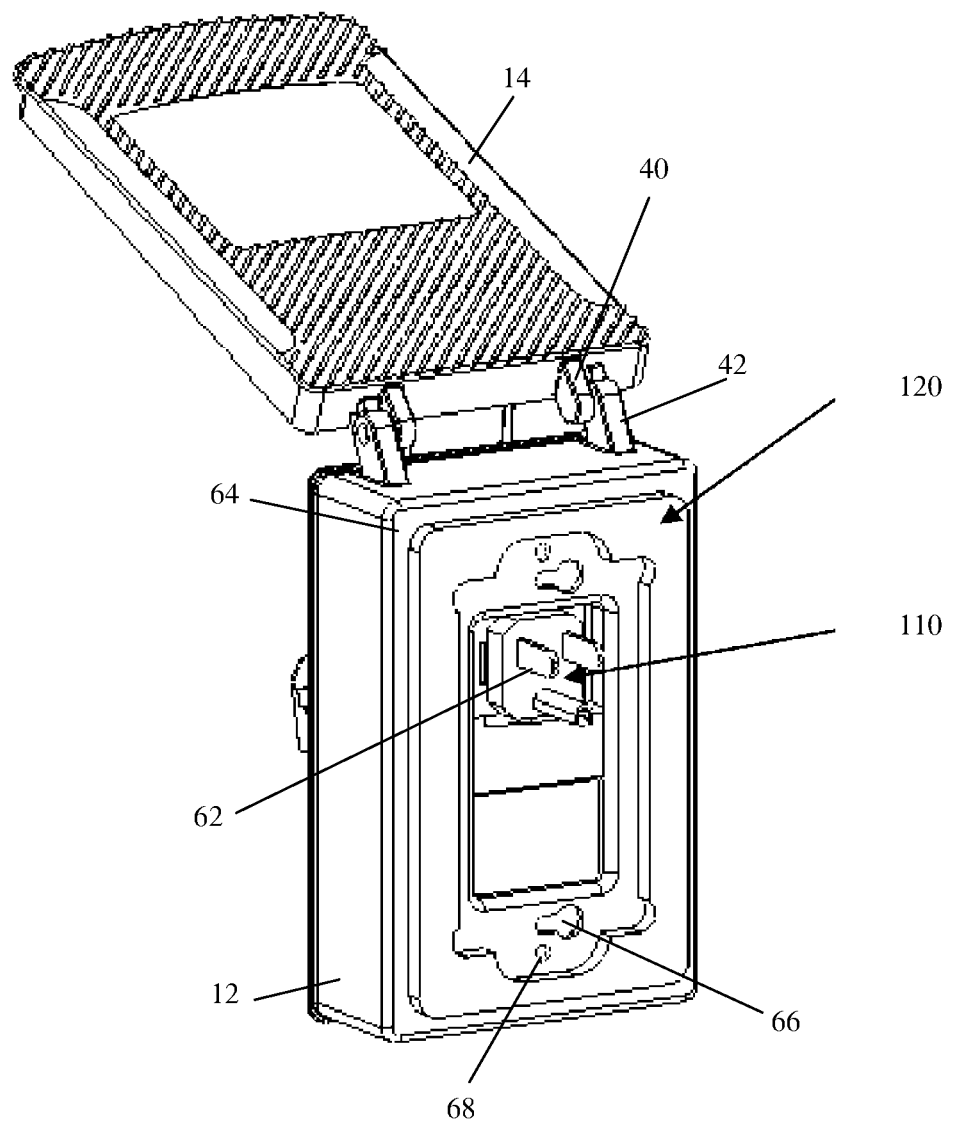
FIG. 19 is a rear perspective view of a while in use cover assembly with adaptor 110.

FIGS. 16-18 illustrate an embodiment wherein the receiver plug(s) 20 are not directly attached to the lid 14. As can be seen in these figures, the receiver plugs 20 are located such that, when the lid 14 is move to an open position (i.e., a position wherein there is access to the inside of the base 12; such that a power cord plug 86 can be attached to the receiver socket 20), the socket face 122 pivots toward the lid, allowing facile access to the socket face 122, and hence to the blade apertures 86. The receiver plug(s) 20 can be designed to pivot, for example, via an arm 142. The arm 142 can extend from the lid 14 to a socket assembly 152 comprising the receiver plug(s) 20. The arm 142 can be hingedly attached to both the lid 14 and the socket assembly 152. As the lid 14 is moved from the closed position to an open position, the lid hinge 146 allows the arm 142 to move (e.g., rotate), the receiver assembly hinge 148 allows the arm to move (e.g., rotate) at the socket assembly 152 as the arm pulls the socket assembly 152, causing the socket face 122 to turn toward the lid. The socket assembly 152 moves, e.g., rotates at the terminals 130, 132. In other words, the socket face 122 moves from a closed position wherein the socket face 122 is perpendicular to the back wall 64, to an opened position wherein the socket face 122 is at an angle Φ of greater than 90 degrees, specifically, 125 to 180 degrees, more specifically, 150 to 180 degrees, to the back wall 64; for example, the face can be parallel to the back wall 64.

The hinges connecting the arm 142 and the lid 14, and connecting the arm 142 and the socket assembly 152 can be any connection arrangement that allows the lid 14 to move between an open and closed position and facilitates the change in angle of the face of the receiver plug(s) 20. For example, the arm 142 or the lid 14 can have an attachment element 150 with a protrusion (e.g., a pin), while the other of the arm 142 or lid 14 has an attachment element 144 with an opening sized and shaped to receive the protrusion. Similarly, the arm 142 or the socket assembly 152 can have an attachment element with a protrusion, while the other of the arm 142 or socket assembly 152 has an attachment element with an opening sized and shaped to receive the protrusion.

As illustrated in FIG. 16, the arm 142 can have an access hole 154 that enables access to the junction box attachment portions 66,68. Alternatively, or in addition, the arm 142 can be removably attached to the lid and/or the socket assembly 152 so as to enable access to the junction box attachment portions 66,68 as the while in use cover is attached to the junction box.

As can be seen in FIG. 18, a cover 140 can be located over the terminals 130,132, retaining the terminals in physical contact with one another while allowing the socket assembly 152 to rotate as the lid is opened and closed. Optionally, the opening of the lid can case the terminals to separate such that electricity cannot flow to the receiver plug(s) when the lid is in the open position.

Alternatively, the receiver plug(s) 20 can be attached to the base 12. As with the lid, the receiver plug(s) 20 can be removably or permanently attached to the base. As mentioned above, the receiver plug(s) 20 can be loose (not attached to the base or lid). In such an embodiment, the only attachment of the cord assembly 52 is the adapter plug 22 being attached to the outlet socket 72 (see FIG. 6).

The number of receiver plug(s) 20 present in the cord assembly 52 is not limited and generally based upon the electrical rating of the outlet with which it will be used. As can be seen, the assembly can comprise greater than or equal to one receiver socket 20, specifically, greater than or equal to two receiver plugs 20 (see FIGS. 4 and 6). The receiver socket 20 can, optionally, comprise a ground aperture 54. The receiver socket 20 can also, optionally, comprise a lid receiver plug portion 56 and a terminal receiver plug portion 58 as illustrated in FIG. 7. In this embodiment, the terminal receiver plug portion 58 can be attached to (e.g., clipped or snapped into) the lid receiver plug portion 56 and the adapter plug cord 24 can be attached to the terminal receiver plug portion 58, when the lid receiver plug portion 56 is integral with or removably attached to the lid 14.

The adapter plug cord 24 can be flexible enough to allow the adapter plug 22 to be moved, i.e., oriented, to enable insertion into the outlet socket 50 after the base 12 has been attached to the junction box 16. The adapter plug 22 can comprise an adapter plug head 60 as illustrated in FIG. 5, which is a back view of the while in use cover assembly 10. The adapter plug head 60 can, optionally, be rotatable itself, or can, optionally, comprise a rotatable face comprising the plug elements 62. Rotation of the adapter plug head 60 face can facilitate insertion of the adapter plug 22 into the outlet socket 50 without having to twist the cord 24.

Turning now to FIGS. 3, 4, 6, and 7, the base 12 is illustrated in further detail. The base 12 can comprise a back wall 64, which can have an aperture 70 that allows the adapter plug 22 to be plugged into an outlet socket 50. The back wall 64 can comprise greater than or equal to one aperture 70 and the aperture 70 can be an equivalent size and shape to the outlet socket 50 and/or adapter plug 22 which will extend through the aperture 70 and attach the cord assembly 52 to the outlet socket 50. Optionally, base 12 can have no back wall and instead, the aperture 70 can extend over the full length and width of the back wall 64.

Optionally, the back wall 64 can comprise removable tab(s) 100 illustrated by the dashed line in FIG. 12 that can allow conversions of the aperture 70 into a different size aperture, for example, so that the aperture can be used with different size sockets (e.g., duplex, GFCI, round, as well as other sockets, etc.). Although rectangular tab(s) are illustrated, it is understood that the tabs can be any shape and size to allow the aperture 70 to be a size and shape that is compatible with an outlet socket with which it will be used. Alternatively, or in addition, the tab(s) 100 can be removed in order to form aperture 70 in a desired location, e.g., over the upper duplex socket, the lower duplex socket, in the middle for a single socket.

Further optionally, the back wall 64 can comprise stub(s) 80 (e.g., snap connector(s)) that can be employed to hold the adapter plug 22 in place so that it is not removed from contact with the socket 72 when lid 14 is in the open position. Hence, the adapter plug 22 can have a rim 92 that engages the stub(s) 80 such that, when the adapter plug 22 is inserted into the socket 72, the rim 92 snaps into the stub(s) 80 (e.g., a portion of the stub(s) 80 will extend over the rim 92, holding the adapter plug 22 against the socket 72).

For aesthetic reasons and ease of installation, the back wall 64 can also comprise various junction box attachment locations and/or elements. For example, junction box attachment portion(s) 66, 68, can use standard holes for receiving a screw or other attachment element, a key hole slot for engaging an element on the junction box, as well as various other shapes, sizes, and amount of attachment points. If desired, the attachment point can be between the back wall and the junction box so as not to be visible when the assembly is attached to a junction box. In such an embodiment, the attachment point can be a pocket extending from the back wall toward the junction box and configured to receive the head of an attachment element extending from the junction box.

The extension 74 can also be designed to enable access to only a portion of the junction box face. In other words, the back wall 64 can be designed to extend across a junction box socket that will not be used. The extension 74 can be perforated or otherwise form removable tab(s) to enable its removal and conversion of the opening 70 for use with other receptacles (e.g., other sockets). As illustrated in FIG. 3, for example, the extension 74 can cover one receptacle of a duplex plug so that only one adapter plug 22 can be attached to the outlet 50 at a time. To enable visibility from the window in the lid 14, the aperture 70 can be sufficiently large or the back wall 64 of the base 12 can comprise an optional additional access port 76 to allow a user to see the status of the outlet (e.g., whether the outlet is functioning properly or requires attention because it has been tripped). The access port 76 can also give a user the capability of resetting the outlet if needed via the reset switch for a GFCI outlet.

The base 12 further comprises a power cord exit 26 that is complimentary to the power cord exit 26 on the lid 14. As is illustrated, the power cord exit(s) 26 can be located at a corner of the base and lid to facilitate use of the assembly in the vertical or horizontal orientations (see e.g., FIGS. 1-7, 10, and 12). In other words, the power cord exit 26 can comprise a power cord exit 104 that is diagonal to the receiver socket 20. Optionally, power cord exit(s) 26 can be located through a wall of the base, instead of a corner. In such an embodiment, the cord can extend straight from the receiver socket 20, out of the cord assembly 52 as illustrated in FIG. 11. In other words, the power cord exit 26 can comprise a power cord exit 106 that is in line with the cord assembly 52.

The base 12 can, optionally, comprise a channel 102 in which the lid 14 can be inserted (e.g., the edge of the base 12 can comprise a channel 102 where the outside perimeter of the lid 14 sits in the channel when the while in use cover assembly 10 is closed). In this embodiment, the channel 102 can also optionally comprise a tapered edge to allow removal of water without entering the while in use cover assembly 10.

Figure 8:
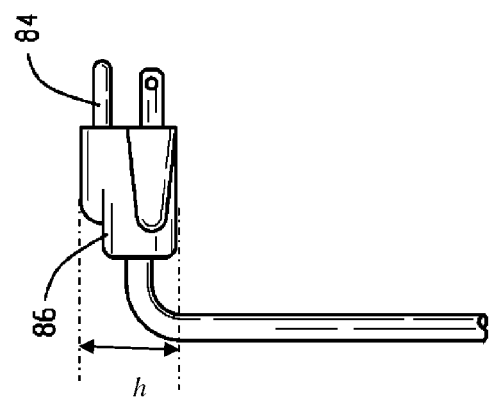
FIG. 8 is a side profile of a power cord.

FIGS. 4, 5, 6, and 7 illustrate the while in use cover assembly 10 in an open position. In the open position, when the receiver socket 20 is attached to the lid 14, the orientation (along axis A) of the receiver socket 20 is at a non-parallel angle to the main axis of the base (e.g., to the base back wall 64), where the main axis extends in the y direction as illustrated in FIG. 6, e.g., the receiver socket 20 is perpendicular to the structure to which the junction box 16 is attached. Having the receiver socket 20 at a non-parallel angle (e.g., in a perpendicular position) while the lid is open facilitates insertion of a power cord plug 86 (FIG. 8) into the receiver socket 20. For example, the receiver socket 20 can contain blade apertures 82 that can be configured to receive a male socket 84. Once the power cord plug 86 has been inserted into the receiver socket 20, the lid 14 can be closed. Optionally the lid 14 can be designed such that the weight of the power cord plug 86 can pull the lid 14 down toward the base 12, to orient the while in use cover assembly 10 into a closed position so that the lid 14 is parallel to the exterior structure to which the junction box 16 is attached (e.g., a self-closing lid). Alternatively, or in addition, the hinge 78 can be a biased hinge (e.g., the hinge can optionally comprise a torsional spring to force the lid to a closed position) that pushes the lid 14 toward the closed position when a force is not exerted against the hinge 78.

Also optional is a locking mechanism that can be secured to restrict access into the cover assembly and/or that can merely assist in retaining the lid in the closed position. The locking mechanism can be of any design that restrains the lid in the closed orientation such that it does not independently move from the closed orientation. Some examples of locking mechanisms include snap connections of the lid and base, mating elements on the lid and base that can optionally receive a lock, and/or simple openings through a lip in the lid and base that can receive a lock, pin, or the like.

It is understood that the present design, and in particular the present cord assembly 52, can be used with various base and lid configurations such as a telescoping base and/or telescoping lid and/or a flexible lid that can change depth. An added advantage of the present cover assembly 10 is its slim profile. Whether the receiver socket 20 is attached to the lid 14, and/or attached to the base 12, and/or is separate from the lid 14 and the base 12, the while in use cover assembly 10 has a constant projection (also referred to as depth) from the junction box 16 to which it is attached when the lid is closed, whether in use (i.e., a power cord is attached) or not in use (i.e., a power cord is not attached). The while in use cover assembly 10 can project from the junction box 16 less than or equal to 2.0 inches, for example, less than or equal to 1.75 inches, specifically, less than or equal to 1.5 inches, and more specifically, less than or equal to 1.25 inches, whether in use or not in use and with the lid in the closed position. A constant projection from the wall provides an aesthetic advantage to the while in use cover assemblies described herein.

A further advantage of the while in use cover assembly 10 disclosed herein is that due to the flexible nature of the adapter plug cord 24 and/or the ability of the adapter plug 22 to rotate, the while in use cover assembly 10 can be oriented vertically or horizontally (with respect to the ground) on a structure. In other words, the long side of the base can be oriented vertically or horizontally with respect to the ground. It is desirable that the lid open away from the ground, so hinges can be located on more than one side of the base and lid to enable the lid to be opened in a desired direction. Optionally, the hinges can be removable such that the lid can be attached to a desired side of the base and the hinges on the undesired side can be removed.

The present while in use cover assembly enables conversion of a duplex outlet which enables insertion of a power plug at an angle that is parallel to the ground, to a duplex outlet that enables an inserted power plug to be oriented at an angle that is perpendicular to the ground. These assemblies can also inhibit access to an unused junction box outlet socket. In other words, the back wall 64 can allow access for the adapter plug to engage an outlet socket 72 while preventing access to the other outlet socket of a duplex outlet.

Methods of making and using the while in use cover assemblies disclosed herein are also contemplated. For example, a method of making a while in use cover assembly can comprise hingedly attaching a lid to a base and attaching a receiver plug to the while in use cover assembly (e.g., attaching the receiver plug to the lid). The receiver plug can be a component of a cord assembly and the receiver plug can be configured to receive a power cord plug. The while in use cover assembly can have a constant depth, when the lid is closed, when in use, and when not in use.

A method of providing electricity to a plug can comprise inserting a plug of an electrical cord into a receiver plug that is attached to a while in use cover assembly comprising a lid hingedly attached to a base. The receiver plug can be attached to the lid of the while in use cover assembly.

Set forth below are some examples of embodiments of the while in use cover assembly and methods for using the same.

Embodiment 1

A while in use cover assembly 10, comprising: a lid 14 hingedly attached to a base 12 having a back wall 64; and socket assembly 52,152 comprising a receiver socket 20 attached to the lid 14 and/or the base 12, and located between the lid 14 and the base 12; wherein the receiver socket 20 comprises a face 122 with blade apertures configured to receive a power cord plug 86; wherein the socket face 122 changes orientation with respect to the back wall 64 when the lid is opened; and wherein the while in use cover assembly 10 is configured to be attached to an outlet socket 50.

Embodiment 2

A while in use cover assembly 10, comprising: a lid 14 connected to a base 12 having a power cord exit 106 and a back wall 64; and socket assembly 52,152 comprising a receiver socket 20 located between the lid 14 and the base 12; wherein the receiver socket 20 comprises a socket face 122 with blade apertures configured to receive a power cord plug 86; wherein the while in use cover assembly 10 has a constant depth, when the lid 14 is closed, when in use and when not in use; and wherein, when the while in use cover assembly 10 is in use, a power cord plug 86 is attached to the receiver socket 20, and a power cord 98 extending from the power cord plug 86 extends through the power cord exit 106 while bending toward the back wall 64 or the lid by less than or equal to 15 degrees as measured from the an angle parallel with an axis A.

Embodiment 3

The while in use cover assembly 10 of any of Embodiments 1-2, wherein the while in use cover assembly 10 has a depth in use and with the lid closed that is less than or equal to 1.5 inches.

Embodiment 4

The while in use cover assembly 10 of any of Embodiments 1-3, wherein the socket assembly 52 further comprising an adapter plug 22 connected to the receiver socket 20 by an adapter plug cord 24, wherein the adapter plug 22 is configured to electrically connect to the outlet socket 50; and wherein the receiver socket 20 is attached to the lid 14.

Embodiment 5

The while in use cover assembly 10 of Embodiment 4, wherein the adapter plug 22 comprises an adapter plug head 60 that is rotatable.

Embodiment 6

The while in use cover assembly of Embodiment 4, wherein the adapter plug head 60 comprises a rotatable face comprising plug elements 62.

Embodiment 7

The while in use cover assembly 10 of any of Embodiments 1-6, wherein the receiver socket 20 is irremovably attached to the lid 14.

Embodiment 8

The while in use cover assembly 10 of any of Embodiments 1-6, wherein the receiver socket 20 is removably attached to the lid 14.

Embodiment 9

The while in use cover assembly 10 of any of Embodiments 1-8, wherein the socket face 122 is non-perpendicular to the back wall 64, when the lid 14 in an open position.

Embodiment 10

The while in use cover assembly 10 of any of Embodiments 1-9, wherein the socket face 122 is non-perpendicular to the back wall 64, when the lid 14 in an open position.

Embodiment 11

The while in use cover assembly 10 of any of Embodiments 1-10, wherein the socket face 122 forms an angle Φ with the back wall 64 when the lid 14 is in an open position, and wherein the angle Φ is 150 to 180 degrees.

Embodiment 12

The while in use cover assembly 10 of any of Embodiments 1-11, wherein the back wall 64 comprises removable tabs 100.

Embodiment 13

The while in use cover assembly 10 of any of Embodiments 1-12, wherein the back wall 64 comprises an extension 74 sized and shaped to cover the outlet socket 50 when the adapter plug 22 is attached to the outlet socket 50.

Embodiment 14

The while in use cover assembly 10 of any of Embodiments 1-12, wherein the back wall 64 further comprises an access port 76 oriented and sized to allow access to an outlet socket interrupter switch 124 when the while in use cover assembly 10 is attached to the outlet socket 50.

Embodiment 15

The while in use cover assembly 10 of any of Embodiments 1-14, wherein the base 12 has a lip 118 extending from the back wall 64 away from the lid 14, wherein the lip 118 is sized and shaped to extend around an outer periphery of a junction box opening.

Embodiment 16

The while in use cover assembly 10 of any of Embodiments 1-15, wherein the base 12 further comprises a channel around a perimeter of the base 12, wherein an outside perimeter of the lid 14 is positioned within the channel when the while in use cover assembly 10 is closed.

Embodiment 17

The while in use cover assembly 10 of any of Embodiments 1-16, wherein the receiver socket 20 is attached to the lid 14 and connected to socket terminals 132, wherein the socket terminals 132 are in physical contact with base terminals 130.

Embodiment 18

The while in use cover assembly 10 of any of Embodiments 1-17, wherein the receiver socket 20 is attached to the lid 14, and wherein the socket face 122 has an angle such that, when a power cord plug 86 is inserted into the receiver socket 20 such that the power cord plug 86 forms a plug angle θ with the lid of greater than 0 degrees.

Embodiment 19

The while in use cover assembly 10 of Embodiment 18, wherein the plug angle θ is 5 to 45 degrees.

Embodiment 20

The while in use cover assembly 10 of any of Embodiments 1-19, wherein the back wall 64 further comprises an aperture 70 that enables access to an interrupter switch 124 when the while in use cover assembly 10 is installed on a junction box.

Embodiment 21

The while in use cover assembly 10 of any of Embodiments 1-20, further comprising: an arm 142 extending from the socket assembly 152 to the lid 14; wherein the socket assembly 152 has socket terminals 132 that are in direct contact with base terminals 130 when the lid 14 is in a closed position; wherein, when the lid is opened, the arm causes the socket face 122 to change positions and form angle Φ with the back wall 64; and wherein the angle Φ is greater than 90 degrees.

Embodiment 22

The while in use cover assembly 10 of Embodiment 21, wherein the arm 142 further comprises access hole 154 that enables access to a junction box attachment portion 66,68 on the back wall 64.

Embodiment 23

The while in use cover assembly 10 of Embodiment 21, wherein the angle Φ is 150 to 180 degrees.

Embodiment 24

The while in use cover assembly 10 of any of Embodiments 1-23, wherein the depth is less than or equal to 1.25 inches.

Embodiment 25

The while in use cover assembly 10 of any of Embodiments 1-24, wherein the receiver plug 20 is integral with the lid 14.

Embodiment 26

The while in use cover assembly 10 of any of Embodiments 1-25, wherein the socket assembly 52 comprises greater than or equal to two receiver plugs 20.

Embodiment 27

The while in use cover assembly 10 of any of Embodiments 1-26, wherein the base 12 has a longer side 126 and a shorter side 128, and wherein the longer side 126 can be oriented on horizontally or vertically, and wherein the lid 14 is oriented parallel to the ground in the open position regardless of whether the longer side 126 is oriented on horizontally or vertically. In other words, a hinge can be located on longer side 126 and/or on the shorter side 128 such that the lid 14 is oriented parallel to the ground in the open position regardless of whether the longer side 126 is oriented on horizontally or vertically.

Embodiment 28

The while in use cover assembly 10 of any of Embodiments 1-27, wherein the adapter plug 22 can be oriented to an angle selected from the group consisting of perpendicular to an orientation of the while in use cover assembly 10, 90° to a perpendicular orientation of the while in use cover assembly 10, 180° to a perpendicular orientation of the while in use cover assembly 10, and combinations comprising at least one of the foregoing.

Embodiment 29

The while in use cover assembly 10 of any of Embodiments 1-28, wherein the back wall 64 further comprises an access port 76 allowing the outlet socket 50 to be reset.

Embodiment 30

A socket assembly 52, comprising: a receiver socket 20 having blade apertures 82 for receiving a power cord plug; and an adapter plug cord 24 extending from the receiver socket 20 to an adapter plug 22; wherein the adapter plug 22 has plug elements 62 extending therefrom and configured to be received in an outlet socket 50; wherein the receiver socket 20 comprises a first surface 94 configured to engage with an attachment mechanism 48 on a lid 14 of a while in use cover assembly 10.

Embodiment 31

The socket assembly 52 of Embodiment 30, wherein the attachment mechanism 48 comprises an adhesive pad, a snap fit engagement, a pressure fit engagement, or a combination comprising at least one of the foregoing.

Embodiment 32

The socket assembly 52 of any of Embodiments 30-31, wherein the adapter plug 22 comprises a rotatable adapter plug head 60.

Embodiment 33

The socket assembly 52 of any of Embodiments 30-32, wherein the adapter plug 22 further comprises a rotatable face comprising the plug elements 62.

Embodiment 34

A method of using a while in use cover assembly 10, comprising: opening a lid of the while in use cover assembly 10, wherein the while in use cover assembly 10 comprises a lid 14 hingedly attached to a base 12 having a back wall 64 with a junction box attachment portion 66,68; and socket assembly 52,152 comprising a receiver socket 20 physically attached to the lid 14 and/or the base 12, and located between the lid 14 and the base 12; wherein the receiver socket 20 comprises a face 122 with blade apertures 82 configured to receive a power cord plug 86; wherein as the lid is opened, the socket face 122 changes orientation with respect to the back wall 64; and attaching the while in use cover assembly 10 to a junction box via the junction box attachment portion 66,68.

Embodiment 35

The method of Embodiment 34, wherein the while in use cover assembly 10 further comprises an arm 142 extending from the socket assembly 152 to the lid 14; wherein the socket assembly 152 has socket terminals 132 that are in direct contact with base terminals 130 when the lid 14 is in a closed position; wherein the change in orientation of the socket face 122 is caused by the arm; and further comprising using an access hole 154 through the arm to access the junction box attachment portion 66,68.

Embodiment 36

A method of using a while in use cover assembly 10, comprising: opening a lid of the while in use cover assembly 10, wherein the while in use cover assembly 10 comprises: a lid 14 hingedly attached to a base 12 having a back wall 64 with a junction box attachment portion 66,68; and socket assembly 52,152 comprising a receiver socket 20 physically attached to the lid 14 and/or the base 12, and located between the lid 14 and the base 12; wherein the receiver socket 20 comprises a face 122 with blade apertures 82 configured to receive a power cord plug 86; changing an orientation of the socket face 122; inserting the male socket 84 into the blade apertures 82; and attaching the while in use cover assembly 10 to a junction box via the junction box attachment portion 66,68.

Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to distinguish one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). The term "or" means "and/or" unless the context clearly states otherwise. The term "removably" is intended to mean that the elements can be separated and reassembled without damage to either element.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A while in use cover assembly (10), comprising:
a lid (14) hingedly attached to a base (12) having a back wall (64); and
socket assembly (52,152) comprising a receiver socket (20) attached to the lid (14) and/or the base (12), and located between the lid (14) and the base (12);
wherein the receiver socket (20) comprises a face (122) with blade apertures configured to receive a power cord plug (86);
wherein the socket face (122) changes orientation with respect to the back wall (64) when the lid is opened; and
wherein the while in use cover assembly (10) is configured to be attached to an outlet socket (50).

2. The while in use cover assembly (10) of claim 1, wherein the back wall (64) further comprises an aperture (70) that enables access to an interrupter switch (124) when the while in use cover assembly (10) is installed on a junction box.

3. The while in use cover assembly (10) of claim 1, wherein the while in use cover assembly (10) has a depth in use and with the lid closed that is less than or equal to 1.5 inches.

4. The while in use cover assembly (10) of claim 1, wherein the socket assembly (52) further comprising an adapter plug (22) connected to the receiver socket (20) by an adapter plug cord (24), wherein the adapter plug (22) is configured to electrically connect to the outlet socket (50); and wherein the receiver socket (20) is attached to the lid (14).

5. The while in use cover assembly (10) of claim 4, wherein the adapter plug (22) comprises an adapter plug head (60) that is rotatable.

6. The while in use cover assembly of claim 4, wherein the adapter plug head (60) comprises a rotatable face comprising plug elements (62).

7. The while in use cover assembly (10) of claim 1, wherein the receiver socket (20) is irremovably attached to the lid (14).

8. The while in use cover assembly (10) of claim 1, wherein the receiver socket (20) is removably attached to the lid (14).

9. The while in use cover assembly (10) of claim 1, wherein the base (12) has a longer side (126) and a shorter side (128), and wherein the longer side (126) can be oriented on horizontally or vertically, and wherein the lid opens away from the ground in the open position regardless of whether the longer side (126) is oriented on horizontally or vertically.

10. The while in use cover assembly (10) of claim 1, wherein the socket face (122) is non-perpendicular to the back wall (64), when the lid (14) in an open position.

11. The while in use cover assembly (10) of claim 1, wherein the socket face (122) forms an angle $\Phi$ with the back wall (64) when the lid (14) is in an open position, and wherein the angle $\Phi$ is 150 to 180 degrees.

12. The while in use cover assembly (10) of claim 1, wherein the back wall (64) comprises removable tabs (100).

13. The while in use cover assembly (10) of claim 1, wherein the back wall (64) comprises an extension (74) sized and shaped to cover the outlet socket (50) when the adapter plug (22) is attached to the outlet socket (50).

14. The while in use cover assembly (10) of claim 1, wherein the back wall (64) further comprises an access port (76) oriented and sized to allow access to an outlet socket interrupter switch (124) when the while in use cover assembly (10) is attached to the outlet socket (50).

15. The while in use cover assembly (10) of claim 1, wherein the base (12) has a lip (118) extending from the back wall (64) away from the lid (14), wherein the lip (118) is sized and shaped to extend around an outer periphery of a junction box opening.

16. The while in use cover assembly (10) of claim 1, wherein the base (12) further comprises a channel around a perimeter of the base (12), wherein an outside perimeter of the lid (14) is positioned within the channel when the while in use cover assembly (10) is closed.

17. The while in use cover assembly (10) of claim 1, wherein the receiver socket (20) is attached to the lid (14) and connected to socket terminals (132), wherein the socket terminals (132) are in physical contact with base terminals (130).

18. The while in use cover assembly (10) of claim 1, wherein the receiver socket (20) is attached to the lid (14), and wherein the socket face (122) has an angle such that, when a power cord plug (86) is inserted into the receiver socket (20) such that the power cord plug (86) forms a plug angle $\theta$ with the lid of greater than 0 degrees.

19. The while in use cover assembly (10) of claim 18, wherein the plug angle $\theta$ is 5 to 45 degrees.

20. The while in use cover assembly (10) of claim 1, further comprising
an arm (142) extending from the socket assembly (152) to the lid (14);
wherein the socket assembly (152) has socket terminals (132) that are in direct contact with base terminals (130) when the lid (14) is in a closed position;
wherein, when the lid is opened, the arm causes the socket face (122) to change positions and form angle $\Phi$ with the back wall (64); and
wherein the angle $\Phi$ is greater than 90 degrees.

21. The while in use cover assembly (10) of claim 20, wherein the arm (142) further comprises access hole (154) that enables access to a junction box attachment portion (66,68) on the back wall (64).

22. The while in use cover assembly (10) of claim 20, wherein the angle Φ is 150 to 180 degrees.

23. A while in use cover assembly (10), comprising:
- a lid (14) connected to a base (12) having a power cord exit (106) and a back wall (64); and
- socket assembly (52,152) comprising a receiver socket (20) located between the lid (14) and the base (12);
- wherein the receiver socket (20) comprises a socket face (122) with blade apertures configured to receive a power cord plug (86);
- wherein the while in use cover assembly (10) has a constant depth, when the lid (14) is closed, when in use and when not in use; and
- wherein, when the while in use cover assembly (10) is in use, a power cord plug (86) is attached to the receiver socket (20), and a power cord (98) extending from the power cord plug (86) extends through the power cord exit (106) while bending toward the back wall (64) or the lid by less than or equal to 15 degrees as measured from an angle parallel with an axis A.

24. A socket assembly (52), comprising:
- a receiver socket (20) having blade apertures (82) for receiving a power cord plug; and
- an adapter plug cord (24) extending from the receiver socket (20) to an adapter plug (22);
- wherein the adapter plug (22) has plug elements (62) extending therefrom and configured to be received in an outlet socket (50); and
- wherein the receiver socket (20) comprises a first surface (94) configured to engage with an attachment mechanism (48) on a lid (14) of a while in use cover assembly (10).

25. The socket assembly (52) of claim 24, wherein the attachment mechanism (48) comprises an adhesive pad, a snap fit engagement, a pressure fit engagement, or a combination comprising at least one of the foregoing.

26. The socket assembly (52) of claim 24, wherein the adapter plug (22) comprises a rotatable adapter plug head (60).

27. The socket assembly (52) of claim 26, wherein the adapter plug (22) further comprises a rotatable face comprising the plug elements (62).

28. A method of using a while in use cover assembly (10), comprising:
- opening a lid of the while in use cover assembly (10), wherein the while in use cover assembly (10) comprises
  - a lid (14) hingedly attached to a base (12) having a back wall (64) with a junction box attachment portion (66,68); and
  - socket assembly (52,152) comprising a receiver socket (20) physically attached to the lid (14) and/or the base (12), and located between the lid (14) and the base (12);
  - wherein the receiver socket (20) comprises a face (122) with blade apertures (82) configured to receive a power cord plug (86);
- wherein as the lid is opened, the socket face (122) changes orientation with respect to the back wall (64); and
- attaching the while in use cover assembly (10) to a junction box via the junction box attachment portion (66,68).

29. The method of claim 28, wherein the while in use cover assembly (10) further comprises an arm (142) extending from the socket assembly (152) to the lid (14);
- wherein the socket assembly (152) has socket terminals (132) that are in direct contact with base terminals (130) when the lid (14) is in a closed position;
- wherein the change in orientation of the of the socket face (122) is caused by the arm; and
- further comprising using an access hole (154) through the arm to access the junction box attachment portion (66,68).

30. A method of using a while in use cover assembly (10), comprising:
- opening a lid of the while in use cover assembly (10), wherein the while in use cover assembly (10) comprises
  - a lid (14) hingedly attached to a base (12) having a back wall (64) with a junction box attachment portion (66,68); and
  - socket assembly (52,152) comprising a receiver socket (20) physically attached to the lid (14) and/or the base (12), and located between the lid (14) and the base (12);
  - wherein the receiver socket (20) comprises a face (122) with blade apertures (82) configured to receive a power cord plug (86);
- changing an orientation of the socket face (122);
- inserting the male socket (84) into the blade apertures (82); and
- attaching the while in use cover assembly (10) to a junction box via the junction box attachment portion (66,68).

* * * * *